(12) United States Patent
Dellock et al.

(10) Patent No.: US 11,267,396 B2
(45) Date of Patent: Mar. 8, 2022

(54) VEHICLE PUDDLE LAMP CONTROL

(71) Applicant: Ford Global Technologies, LLC, Dearborn, MI (US)

(72) Inventors: Paul Kenneth Dellock, Northville, MI (US); Stuart C. Salter, White Lake, MI (US); David Brian Glickman, Southfield, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 16/776,296

(22) Filed: Jan. 29, 2020

(65) Prior Publication Data

US 2021/0229597 A1 Jul. 29, 2021

(51) Int. Cl.
*B60Q 1/50* (2006.01)
*B60Q 1/24* (2006.01)
(Continued)

(52) U.S. Cl.
CPC ............... *B60Q 1/503* (2013.01); *B60Q 1/24* (2013.01); *G09F 19/18* (2013.01); *G09F 19/22* (2013.01); *G09F 21/04* (2013.01); *H05B 47/115* (2020.01); *H05B 47/19* (2020.01)

(58) Field of Classification Search
CPC ........ B60Q 1/24; B60Q 1/0023; B60Q 1/503; B60Q 1/323; B60Q 2400/40;
(Continued)

(56) References Cited

U.S. PATENT DOCUMENTS 9,178,371 B2 11/2015 Koelsch
9,953,538 B1 * 4/2018 Matthiesen ............ B60Q 1/268
(Continued)

FOREIGN PATENT DOCUMENTS

KR 20130101734 A 9/2013

OTHER PUBLICATIONS

Kranz, Rick, "Automakers Turn Puddle Lights Into Surprise-and-Delight Feature," Edmonds, Nov. 26, 2014.

*Primary Examiner* — Alexander H Taningco
*Assistant Examiner* — Pedro C Fernandez
(74) *Attorney, Agent, or Firm* — Brandon Hicks; Eversheds Sutherland (US) LLP (57) ABSTRACT

A vehicle includes a puddle lamp control system configured to control a puddle lamp to display vehicle identification information, passenger information, advertisements, company logos, and other information on a ground surface proximate to the vehicle. The puddle lamp control system may communicate with a central server using high-speed wireless communication protocols such as Wi-Fi, Wi-max, or other protocols to select images and animations based on vehicle location and pedestrian activity nearby the vehicle. The system may also activate the vehicle puddle lamps based on vehicle sensor triggers associated with vehicle location, based on population and pedestrian density indicative of potential message viewers indicating when pedestrians are close enough to the vehicle to view the advertisement, and based on ridehail activity such as ridehail user information, and seat assignments. The messages and images may be customized using an interface device onboard the vehicle.

18 Claims, 6 Drawing Sheets

(51) Int. Cl.
  *G09F 19/18*   (2006.01)
  *H05B 47/115*  (2020.01)
  *G09F 21/04*   (2006.01)
  *H05B 47/19*   (2020.01)
  *G09F 19/22*   (2006.01)

(58) Field of Classification Search
  CPC .. B60Q 2400/50; H05B 47/19; H05B 47/115; G09F 19/18; G09F 19/22; G09F 21/04; B60W 60/00253; G06Q 50/30
  See application file for complete search history.

(56) References Cited

U.S. PATENT DOCUMENTS

| | | | |
|---|---|---|---|
| 10,065,555 B2* | 9/2018 | Abrams | B60Q 1/24 |
| 10,160,380 B1* | 12/2018 | Salter | B60Q 1/503 |
| 2012/0280528 A1 | 11/2012 | Dellock et al. | |
| 2014/0320823 A1 | 10/2014 | Ammar et al. | |
| 2017/0240098 A1* | 8/2017 | Sweeney | B60Q 1/50 |
| 2018/0039917 A1* | 2/2018 | Buttolo | B60W 60/00253 |
| 2018/0075754 A1* | 3/2018 | Salter | G06Q 10/02 |
| 2018/0257546 A1* | 9/2018 | Johnson | B60Q 1/24 |
| 2018/0354411 A1* | 12/2018 | Shmueli Friedland | G05D 1/0246 |
| 2019/0106050 A1* | 4/2019 | Kamhi | B60Q 1/323 |
| 2019/0164344 A1* | 5/2019 | Potter | B60R 25/31 |
| 2019/0318159 A1* | 10/2019 | Blanc-Paques | B60W 40/08 |
| 2020/0074507 A1* | 3/2020 | Takemura | G06Q 30/0266 |
| 2021/0026345 A1* | 1/2021 | Ito | B60R 25/24 |
| 2021/0027334 A1* | 1/2021 | Suthar | H04W 4/021 |

* cited by examiner

VEHICLE PUDDLE LAMP CONTROL

TECHNICAL FIELD

The present disclosure relates to vehicle puddle lamps, and more particularly, to dynamically programmable vehicle puddle lamp systems.

BACKGROUND

Automotive vehicles are increasingly employing lighting devices, such as puddle lamps, for enhanced lighting applications. Puddle lamps have been employed to illuminate a beam of light onto a ground surface in an area adjacent to the vehicle door when the door is to be opened. The puddle lamp thereby provides illumination to a driver or passenger of the vehicle to observe the area for approaching or stepping out of the vehicle, such as for the existence of a puddle of water. As autonomous and ridehail vehicles become more common, it may be advantageous to utilize the puddle lamps to make ridehail vehicles identifiable to passengers, to inform passengers connecting to the ridehail service that a particular vehicle is their intended vehicle, or to project information that may be useful in other ways, such as making potential customers aware that the ridehail vehicle is empty and can be hired. The term ridehail includes rideshare services.

It may also be advantageous to generate revenue through third party advertisements using the puddle lamps through advertising and targeting specific customers with unique ads based on location and or weather.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is directed to the use of a puddle lamp on a vehicle for displaying still and animated images to individuals nearby a vehicle, may include puddle lamps at areas proximate to the vehicle doors and/or other areas of the vehicle exterior. The information may include welcome and identification information for a ridehail user by displaying a company logo, rider seat assignment, or other message. The still and animated images may also include advertisement messages for businesses associated with the geographic location of the vehicle, such that the puddle lamp serves as a mobile billboard on the sidewalk near the vehicle, and may be coordinated with a central server using a puddle lamp controller.

Businesses and services may coordinate advertising efforts with the central server that wirelessly connects with fleet vehicles, such that vehicles associated with the ridehail service and the central server may advertise messages in a coordinated effort. The puddle lamp controller may send vehicle location and identification information to the central server, and receive instructions to activate the vehicle puddle lamps based on sensor triggers indicating when pedestrians are close enough to the vehicle to view the advertisement, geo-location triggers, and estimations of population and/or pedestrian density that may predict potential message viewers. The remote server may select the messages and animations to display via the vehicle puddle lamps, and may dynamically select the output using high-speed wireless connections such as Wi-Fi, Wi-max, or other wireless data communication technology.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
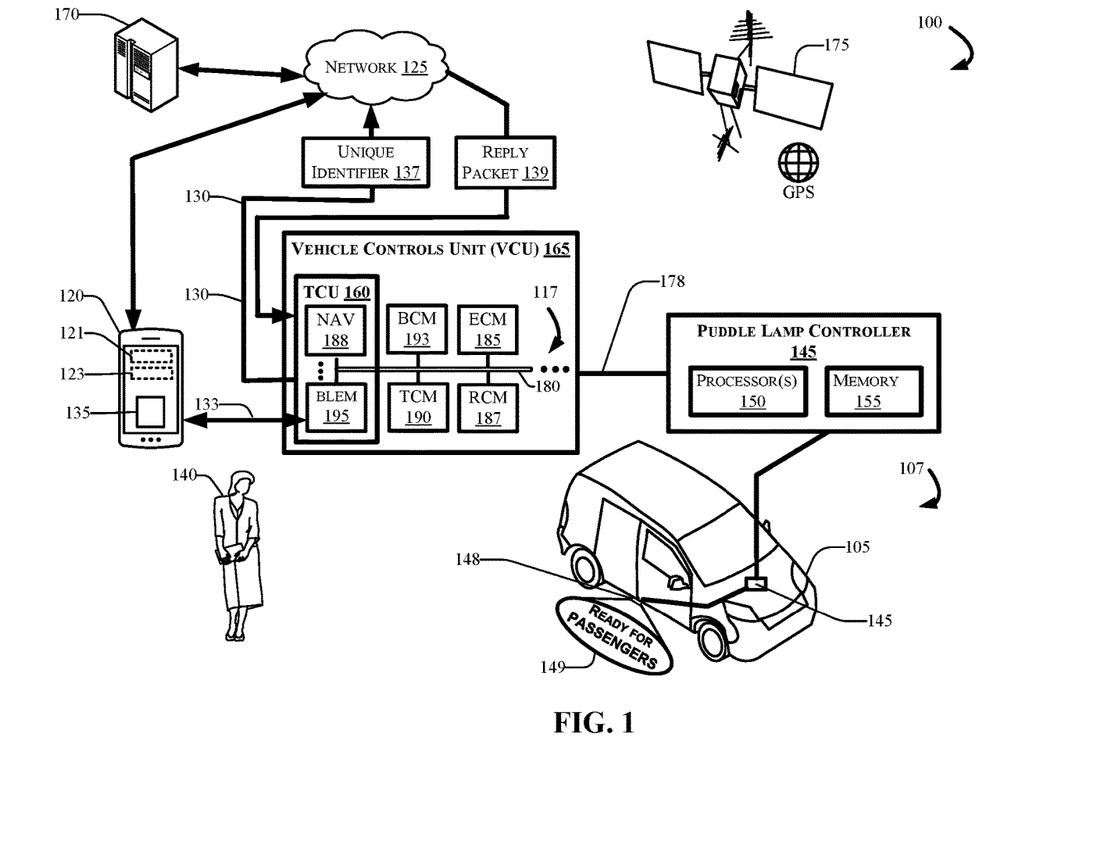
FIG. 1 depicts an example computing environment in which techniques and structures for providing the systems and methods disclosed herein may be implemented.

FIG. 1 depicts an example computing environment 100 that can include a vehicle 105 comprising a puddle lamp controller 145, and a Vehicle Controls Unit (VCU) 165 that typically includes a plurality of electronic control units (ECUs) 117 disposed in communication with the puddle lamp controller 145. A mobile device 120, which may be associated with a user 140 and the vehicle 105, may connect with the puddle lamp controller 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques. The vehicle 105 may also receive and/or be in communication with a Global Positioning System (GPS) 175.

The puddle lamp controller 145 may be or include an electronic vehicle controller, having one or more processor(s) 150 and memory 155. The puddle lamp controller 145 may, in some example embodiments, be disposed in communication with the mobile device 120, and one or more server(s) 170. The puddle lamp image server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet. For example, the puddle lamp control system 107 may be disposed in communication with the puddle lamp image server(s) 170, which may also serve as the SDN, where the puddle lamp image server(s) 170 coordinate advertising messages to be projected by the puddle lamp 148 according to geographic location of the vehicle 105. In other aspects, the puddle lamp image server(s) 170 may also be associated with a ridehail platform that coordinates ridehail users with ridehail services provided by the vehicle 105. Accordingly, the image server(s) 170 may coordinate the messages projected by the puddle lamp controller onboard the vehicle 105, where the messages are associated with particular ridehail users that may engage the vehicle 105 in a ridehail, a vehicle route, a vehicle speed, a mobile device density within a geo-fenced area that indicates a number of potential viewers carrying mobile devices, and other population density information that may be obtainable from public record sources online, etc.

The puddle lamp controller 145 is disposed in communication with a puddle lamp 148. The puddle lamp 148 may be or include one or more puddle lamp projection technologies that are known in the art for providing light to ground areas proximate the vehicle 105 based on various control inputs. One such example system is described in U.S. patent application Ser. No. 15/343,498 (currently assigned to Ford Global Technologies LLC), which is incorporated herein by reference. In another aspect, the puddle lamp 148 may be and/or include one or more laser light emitting diode (LED) laser projectors that can project stationary or moving images to ground surfaces during the day or night. Although aspects of the present disclosure refer to a singular puddle lamp 148, it should be appreciated that any number of puddle lamps are contemplated and intended when referencing the puddle lamp 148. For example, individual puddle lamps may be positioned at every point of vehicle entry, as well as other locations around the bottom of the vehicle 105.

In one embodiment, the puddle lamp control system 107 may send a unique identifier 137 that identifies the vehicle 105 and/or the puddle lamp controller 145 to the puddle lamp image server(s) 170 through the wireless communication channel 130 via the network 125. The puddle lamp image server(s) 170 may determine a position of the vehicle 105 relative to the vehicle surroundings (e.g., parked on a right curb, parked on a left curb, etc.), evaluate advertising arrangements made with businesses and services proximate the vehicle 105, determine other possible criteria such as weather conditions, and generate a reply packet 139 that can include instructions for projecting one or more particular images, messages, animations, etc. 149 (hereafter "image 149") on an adjacent ground surface (e.g., a sidewalk, road surface, etc.). The puddle lamp controller 145 may display the image 149 on the ground surface responsive to receiving the reply packet 139, and further in response to other various inputs that can include the GPS signal feed from the GPS 175, ridehail users and/or other individuals proximate to the vehicle 105, and/or according to manually-programed control instructions.

Although illustrated as a van, the vehicle 105 may take the form of another passenger or commercial automobile such as, for example, a car, a truck, a sport utility, a crossover vehicle, a minivan, a taxi, a bus, etc., and may be configured to include various types of automotive drive systems. Exemplary drive systems can include internal combustion engine (ICE) powertrains having a gasoline, diesel, or natural gas-powered combustion engine with conventional drive components such as, a transmission, a drive shaft, a differential, etc. In another configuration, the vehicle 105 may configured as an electric vehicle (EV). More particularly, the vehicle 105 may include a battery EV (BEV) drive system, or be configured as a hybrid EV (HEV) having an independent onboard power plant, a plug-in HEV (PHEV) that includes a HEV powertrain connectable to an external power source, and including a parallel or series hybrid powertrain having a combustion engine power plant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, the puddle lamp control system 107 may be configured to operate with a vehicle having any level of autonomous vehicle controller, or with a human-operated vehicle.

The mobile device 120 generally includes a memory 123 for storing program instructions associated with a ridehail application 135 that, when executed by a mobile device processor 121, performs aspects of the disclosed embodiments. The application (or "app") 135 may be part of the puddle lamp control system 107, or may provide information to and/or receive information from the puddle lamp control system 107. For example, if the user 140 is an operator of the vehicle 105, the application(s) 135 may be and/or include a ridehail application configured to coordinate ridehail rides with other users of the service. According to embodiments described herein, the application(s) 135 may also include an application program interface (API) for programming the puddle lamp 148 such that it projects particular messages that may coordinate with ridehail user information. For example, the application(s) 135 may determine name and other information associated with ridehail riders (not shown in FIG. 1), assign ridehail riders to particular vehicle positions, and use one or more puddle lamps 148 to project name information, ridehail vehicle identification, and availability for the vehicle 105 to perform ridehail services, etc. For example, FIG. 1 depicts the image 149 indicating that the vehicle 105 is "Ready for Passengers", where pedestrians (not shown in FIG. 1) that are close enough to the vehicle 105 to view the message indicated by the image 149 are alerted to the vehicle's availability to engage in a ridehail.

In some aspects, the mobile device 120 may communicate with the vehicle 105 through the one or more channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the network 125, and via one or more direct connection(s) 133. The connection(s) 133 may include various low-energy protocols including, for example, Bluetooth®, BLE, or other Near Field Communication (NFC) protocols.

The network(s) 125 illustrate an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The puddle lamp controller 145 may be installed in an engine compartment of the vehicle 105 (or elsewhere in the vehicle 105) and operate as a functional part of the puddle lamp control system 107, in accordance with the disclosure. The puddle lamp controller 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a program code configured to cause the processor(s) 150 to execute some or all of the disclosed steps. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 180, and may be configured to coordinate the data between vehicle 105 systems, connected servers (e.g., the puddle lamp image server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the ridehail application 135 operating on the mobile device 120, from one or more instruction sets received from the puddle lamp control system 107, and/or from instructions received from an AV controller, such as an AV controller 245 discussed with respect to FIG. 2.

The TCU 160 can be configured to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity or client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the puddle lamp controller 145, the puddle lamp control system 107, and/or the puddle lamp image server(s) 170, etc.), and may also communicate with one another without the necessity of a host computer. The bus 180 may connect the ECUs 117 with the puddle lamp controller 145 such that the puddle lamp controller 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the puddle lamp control system 107, and/or via wireless signal inputs received via the wireless channel(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. The BCM 193 may also sense the proximity of ridehail and other users when they are nearby the vehicle, which may be, in one embodiment, within a predetermined radius of distance from the vehicle 105 (e.g., 2 meters, 5 meters, 10 meters, etc.).

The computing system architecture of the puddle lamp controller 145, VCU 165, and/or the puddle lamp control system 107 may omit certain computing modules. It should be readily understood that the computing environment depicted in FIG. 1 is one example of a possible implementation according to the present disclosure, and thus, it should not to be considered limiting or exclusive.

Figure 2:
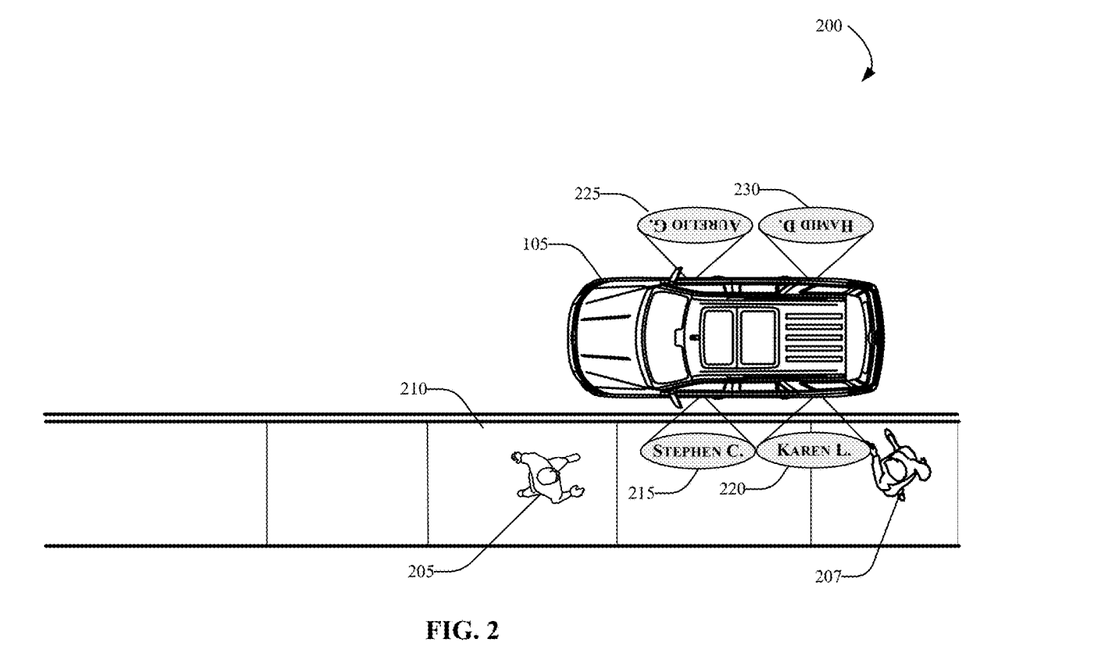
FIG. 2 illustrates a first example embodiment where the puddle lamp control system 107 projects information for ridehail users in accordance with the present disclosure.

FIG. 2 illustrates a first example embodiment where the puddle lamp control system 107 projects information for ridehail users in accordance with the present disclosure. When ridehail users such as the ridehail users 205 and 207 approach the vehicle 105, the assigned seating position for the respective ridehail user may not be clear, and the ridehail user may not be sure which vehicle door is the appropriate point of entry. In one aspect, the puddle lamp image server(s) 170 may be associated with and/or be part of the ridehail service that provides the ridehail coordination for the ridehail users 205 and 207. The puddle lamp controller 145 may send the unique identifier 137 to the puddle lamp image server(s) 170 via the TCU 160, with which the vehicle 105 may connect to the network 125. The unique identifier 137 may include additional information including, for example, ridehail information that includes ridehail user identity information, route information, GPS information, and other information as described in various aspects hereafter.

The puddle lamp image server 170 may send the reply packet 139 to the vehicle 105, again through the TCU 160, that includes an image associated with the geographic location of the vehicle 105. In some aspects, the image may be and/or include string data (e.g., words and numbers to display via the puddle lamp 148). The image data may also include an animation, and/or may include audio content for output using one or more vehicle speakers (not shown in FIG. 2). As shown in FIG. 2, the image associated with the geographic location of the vehicle 105 may include text messages 215, 220, 225, and 230 (as examples), which include the first name and last initial of four ridehail users expected at this particular geographic location. Other messages are contemplated, such as, for example, instructions for entering the vehicle, ridehail vehicle identification, advertisements for the ridehail service associated with the vehicle 105, etc.

Figure 3:
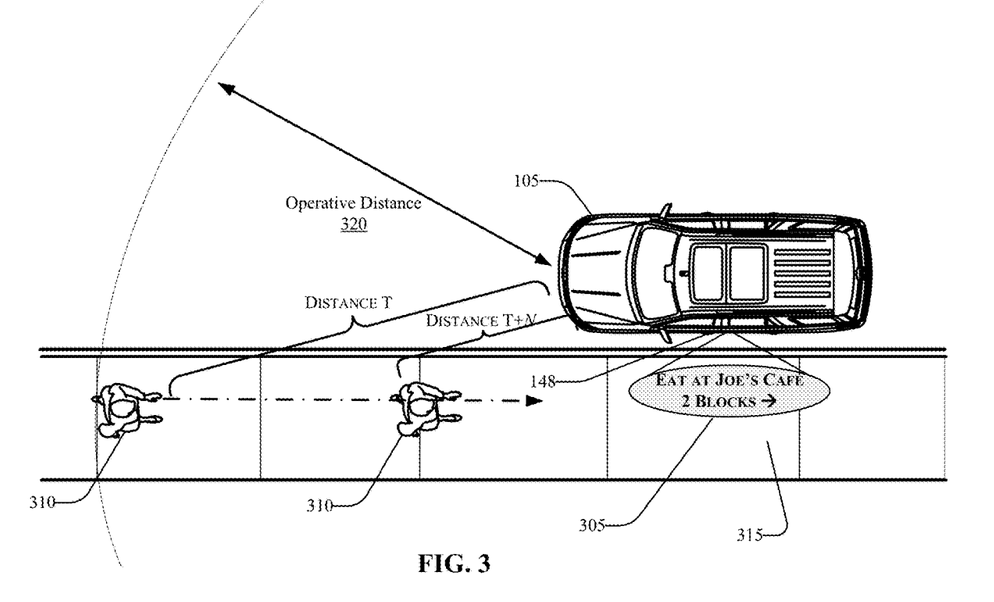
FIG. 3 illustrates a second example embodiment where the puddle lamp control system 107 projects advertisement messages and other information received from a puddle lamp image server in accordance with the present disclosure.

FIG. 3 illustrates a second example embodiment where the puddle lamp control system 107 projects images (e.g., the image 149 as shown in FIG. 1), advertisement messages, animations, and other information received from a puddle lamp image server 170 in accordance with the present disclosure. Although not shown in FIG. 3, the puddle lamp image server 170 may be disposed in communication with a plurality of vehicles configured with puddle lamp controllers and puddle lamps substantially similar or identical to the puddle lamp control system 107 as described with respect to FIG. 1. Accordingly, the image server 170 may coordinate advertising efforts for the entire fleet using wireless communication protocols to connect with the vehicle fleet simultaneously (or substantially simultaneously) such that the entire fleet projects an image at the same time, based on geographic or other considerations. Moreover, the puddle lamp control system 107 may further include sound output capability such that the image or animation is accompanied by sound output such as music, spoken words, sound effects, etc.

The vehicle 105 may be equipped with one or more sensors that detect proximity of individuals (described herein as pedestrians) that may be nearby the vehicle 105. For example, capacitive sensor systems, cameras, Bluetooth® communication devices, near-field communication devices, etc., may be used to determine when individuals and personal computing devices (e.g., smartphones, etc.) are nearby the vehicle. FIG. 3 depicts a pedestrian 310 walking toward the vehicle 105. In one aspect, the puddle lamp control system 107 may determine that the pedestrian 310 is within an operative distance 320 from the vehicle 105. The pedestrian 310 may be a ridehail user, with the intent of entering the vehicle 105 to engage in the ridehail services offered by the vehicle 105. In another aspect, the pedestrian 310 may be unassociated with the vehicle 105 except for being proximate to the vehicle 105.

The puddle lamp controller 145 may receive, from a vehicle sensor (not shown in FIG. 3) data indicative that the pedestrian 310 is approaching the vehicle 105. For example, the BCM 193, or another vehicle module associated with vehicle sensing functionality may estimate a distance (Distance T) from the vehicle 105 to the pedestrian 310 approaching the vehicle 105. The BCM 193 (or another operative control module performing the measurements) may take multiple samples of the distance at time T, time T+1, time T+2, . . . time T+N, etc. Responsive to determining that the distance is less than the operative distance 320 (which may be a threshold value for distance), the BCM 193 may send a proximity message (not shown in FIG. 3) to the puddle lamp controller 145. The proximity message may indicate the distance from the vehicle 105 to the pedestrian 310 approaching the vehicle 105, and an estimate of how long the pedestrian 310 may be proximate the vehicle 105 such that the pedestrian can see the message 305 projected on the ground surface 315.

The advertising message 305 may be and/or include an image having indicia of a business or service associated with the geographic location of the vehicle 105. In other aspects, the orientation of the vehicle 104 may also be known to the puddle lamp control system 107 based on GPS information received from the NAV system 177, the GPS signal from the GPS 175, and/or from information received from the puddle lamp image server(s) 170 via the reply packet 139. Accordingly, the puddle lamp controller 145 may be further configured to visually project indicia of relative directions such as displaying a directional arrow, distance information (e.g., "three blocks ahead"), detail of route instructions (e.g., "follow Main Street two blocks and take a left on $1^{st}$"), a phone number, an address, etc.

The vehicle 105 may determine an intent of the pedestrian 310 based on several criteria that are observable by the vehicle systems, including device recognition of a mobile device carried by the pedestrian 310, facial recognition technology using facial recognition data retrieved from the pedestrian 310 as part of prior ridehail service trips, voice recognition, and other observable physical cues that may be processed based on the pedestrian's actions such as walking pace, trajectory, body movements, etc. Accordingly, the puddle lamp controller 145 may change the advertising message 305 based on the pedestrian's analyzed possible intent to enter the vehicle, or some other intent. For example, if the puddle lamp controller 145 determines that the pedestrian 310 is a ridehail user, the puddle lamp controller 145 may cause the puddle lamp 148 to change the advertisement or other message 305 to a welcome message that greets the ridehail user, indicates an available seat or door at which the user may find seating room, and/or display other useful rider information.

In another aspect, it may be advantageous to project the advertising message 305 only when a predetermined density of observers that may be proximate to the vehicle 105 is extant. For example, it may not be an intended use of the vehicle's battery or other electrical resources to project advertisement messages to just two possible observers on an entire city block. Accordingly, the vehicle 105 may determine a threshold of mobile devices operative within a range of distance from the vehicle (which may be, for example, the operative distance 320, or a greater distance). The puddle lamp controller 145 may send, to the puddle lamp image server(s) 170, the unique identifier indicative of the puddle lamp controller 145 onboard the vehicle 105, the geographic location of the vehicle 105, and the number of mobile devices (not shown in FIG. 3) observed by sensors operative within the range of distance from the vehicle 105. The puddle lamp image server(s) 170 may send the reply packet 139 to the vehicle 105, which can include the advertising message 305 associated with the geographic location of the vehicle 105, and further include an instruction for displaying the advertising message 305 based on the number of mobile devices operative within the range of distance from the vehicle 105. Accordingly, the puddle lamp 148 may display the advertising message 305 on the ground surface proximate to the vehicle responsive to receiving the reply packet, and also based on the instruction from the puddle lamp image server(s) 170.

Although FIG. 3 depicts the vehicle 105 as parked at a curb near a walkway, the vehicle 105 may also be configured to project one or more images onto the adjacent ground surface 315 while the vehicle 105 is in motion, and/or when the vehicle is stopped at intersections. Accordingly, it may be advantageous to route vehicle ridehail trips according to pedestrian density within a given geographic location. In another example embodiment, the vehicle 105 may receive, from the puddle lamp image server(s) 170, the reply packet 139 that includes the advertising message 305 associated with the geographic location of the vehicle, and a route associated with the number of mobile devices operative within the range of distance from the vehicle. Accordingly, the puddle lamp controller 145 may communicate information to an autonomous vehicle controller (not shown in FIG. 3) indicative of route instructions that guide the vehicle 105 through strategic locations such that an increased number of advertising viewers may see the projected images. The vehicle 105 may thus follow the instructed route while displaying the image 305 on the adjacent ground surface 315.

Figure 4:
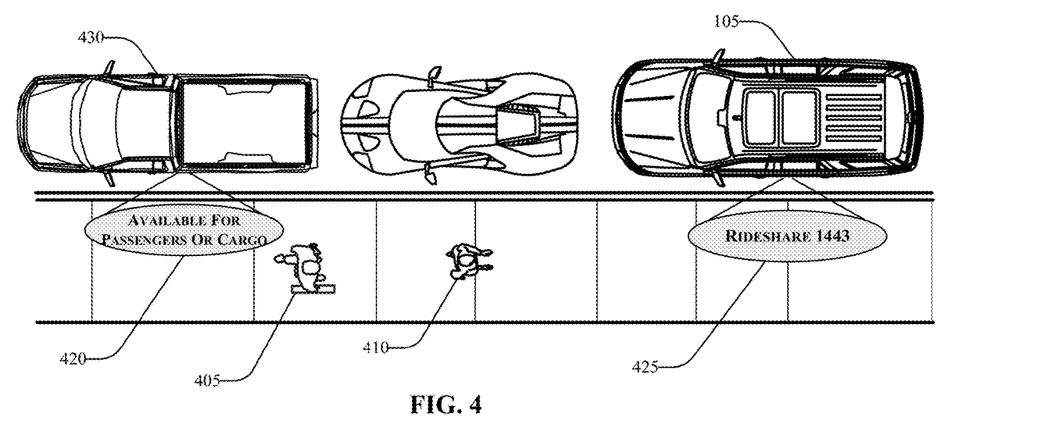
FIG. 4 illustrates a third example embodiment where the puddle lamp control system 107 projects information that identifies a ridehail vehicle to ridehail users in accordance with the present disclosure.

FIG. 4 illustrates a third example embodiment where the puddle lamp control system 107 projects information 420 that identifies an available ridehail vehicle to ridehail users 405, 410 in accordance with the present disclosure. Generally speaking, when ridehail users approach a line of vehicles at locations such as airports and other transportation hubs, it may not be clear to the ridehail passengers which vehicle is the vehicle to which they are assigned for the ridehail trip. In an example embodiment, a plurality of ridehail users 405 and 410 may be assigned to the vehicle 105 by the ridehail service (not shown in FIG. 4). The vehicle 105 may project the image 425, which may include a vehicle identification number that is also known to the ridehail users 405 and 410.

In another aspect, a vehicle may be available for passengers or cargo for impromptu use by pedestrians that are in the area, and may wish to advertise such facts to these pedestrians. A vehicle 430 is depicted to illustrate one such use of the puddle lamp control system 107, where the vehicle 430 projects an image and/or message 420 indicating that the vehicle 430 is available for passengers or cargo.

Figure 5:
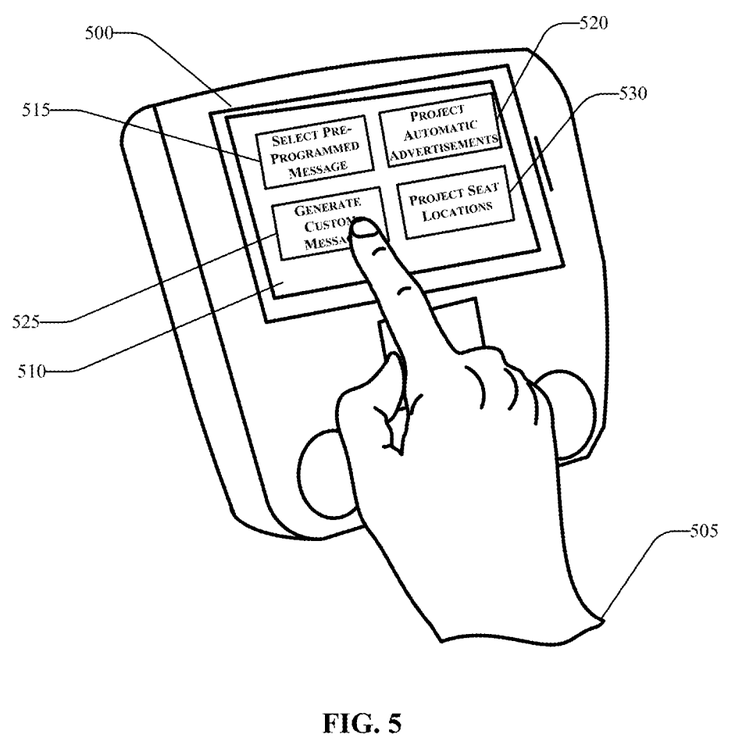
FIG. 5 depicts an example user interface inside of the vehicle for manual control of the puddle lamp control system in accordance with the present disclosure.

FIG. 5 depicts an example user interface 500 for use inside of the vehicle 105, which may provide manual control of the puddle lamp control system 107, in accordance with the present disclosure. In some aspects, it may be advantageous to provide a control interface such as the example interface 500, for controlling the projected message depicted in prior FIGS. 1-4. For example, as shown in FIG. 5, the interface 500 may include a touchscreen display 510 that is configured to present a plurality of selectable icons 515, 520, 525, and 530, that may trigger one or more second interfaces (not shown in FIG. 5) for selecting pre-programmed messages (as indicated by the selectable icon 515), for projecting automatic advertisements (as shown by the selectable icon 520), for generating custom messages (as indicated by the selectable icon 525) and for projecting seat locations assigned to ridehail users (as indicated by the selectable icon 530). Other selectable options are possible, and such options are contemplated.

In one aspect, selection of the selectable icon 515 may cause the processor(s) 150 to output one or more pre-defined messages to be displayed by the puddle lamp 148. For example, "Available for Rideshare Passengers" may be an example of such a message.

Selection of the selectable icon 520 may cause the puddle lamp controller 145 to be configured for automatic messaging control such that the image server 170 or a locally-stored series of images, animations, advertisements, sound files, etc., are projected by the puddle lamps according to instructions received by the puddle lamp image server(s) 170, as described in prior embodiments.

Generation of a custom message may include names of particular individuals, instructions, etc., that may be projected by the puddle lamp 148. For example, the puddle lamp controller 145 may receive messages using a wired or wireless connection onboard the vehicle 105 to flash the advertising and messaging data to the controller 145. Accordingly the selectable icon 525 may trigger a second interface screen (not shown in FIG. 5) that provides options for selecting a time setting (based on a time of day, a time allocated for display, etc.), a camera setting indicating particular puddle lamps with which the images are to be displayed, a location setting (based on GPS location) that indicates geo-fenced locations within which the images and messages should be displayed, camera color settings, camera brightness settings, battery saving options, and other user-selectable options.

Selection of the selectable icon 530 may cause the puddle lamp control system 107 to output a map of the vehicle seating layout, with names or other identifiers of ridehail passengers assigned to a ridehail trip. Accordingly, the ridehail service may provide a list of ridehail passengers, route information, etc., which may be used to generate a list of selectable names that may be matched with particular seating positions. Accordingly, a respective door of the vehicle may be more convenient than other doors for entry and exit given the seat assignment. The puddle lamp controller 145 may project a ridehail username, symbol, message, or other information according to the assigned seat location.

Figure 6:
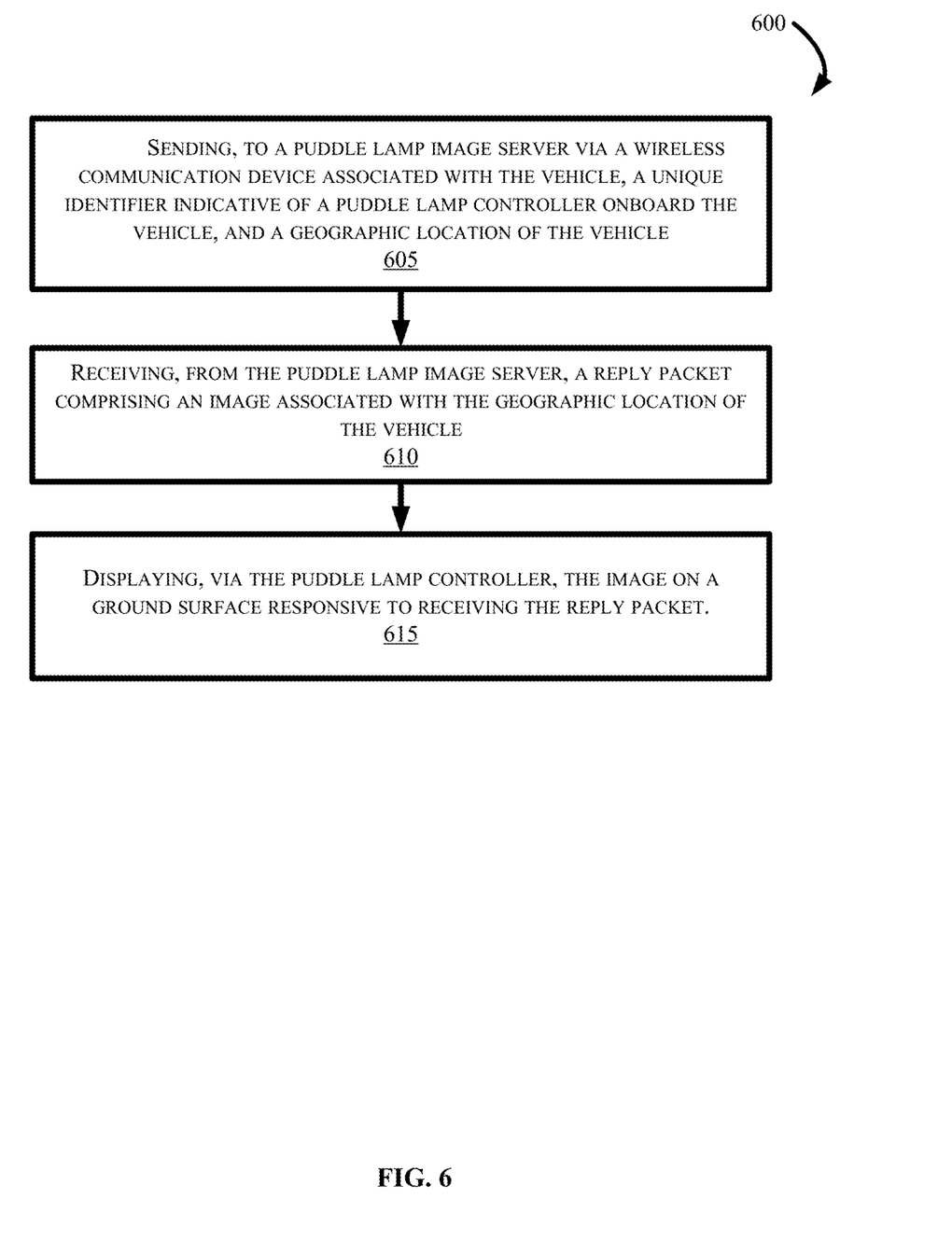
FIG. 6 depicts a flow diagram in accordance with the present disclosure.

FIG. 6 is a flow diagram of an example method 600 for controlling a puddle lamp, according to the present disclosure. FIG. 6 may be described with continued reference to prior figures, including FIGS. 1-5. The following process is exemplary and not confined to the steps described hereafter. Moreover, alternative embodiments may include more or less steps than are shown or described herein, and may include these steps in a different order than the order described in the following example embodiments.

Referring first to FIG. 6, at step 605, the method 600 may commence with sending, to a puddle lamp image server via a wireless communication device associated with the vehicle, a unique identifier indicative of a puddle lamp controller onboard the vehicle, and a geographic location of the vehicle.

At step 610, the method 600 may further include receiving, from the puddle lamp image server, a reply packet comprising an image associated with the geographic location of the vehicle. The reply packet can further include trip information associated with a ridehail user.

At step 615, the method may further include displaying, via the puddle lamp controller, the image on a ground surface responsive to receiving the reply packet. This step may include determining that the ridehail user is within an operative distance from the vehicle, and displaying the image on the ground surface in response to receiving the reply packet, and further in response to determining that the ridehail user is within the operative distance from the vehicle.

Determining that the ridehail user is within the operative distance from the vehicle can include receiving, from a vehicle sensor, data indicative of the ridehail user approaching the vehicle, estimating, and processing the received data indicative of the ridehail user, and data indicative of a distance from the vehicle to the ridehail user approaching the vehicle. Responsive to determining that the distance is less than a threshold value, this step may include sending a proximity message to a puddle lamp controller. The proximity message may be indicative of the distance from the vehicle to the ridehail user approaching the vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a puddle lamp controller associated with a vehicle, comprising:
    sending, to a puddle lamp image server via a wireless communication device associated with the vehicle, a unique identifier indicative of the puddle lamp controller onboard the vehicle, and a geographic location of the vehicle;
    receiving, from the puddle lamp image server, a reply packet comprising an image associated with the geographic location of the vehicle; and
    displaying, via the puddle lamp controller, the image on a ground surface responsive to receiving the reply packet, wherein the image comprises indicia of a business or service associated with the geographic location of the vehicle, wherein the image further includes a directional arrow or route instructions to a location of the business or service.

2. The method according to claim 1, wherein the vehicle is an autonomous vehicle associated with a ridehail service.

3. The method according to claim 1, wherein the reply packet further comprises trip information associated with a ridehail user, and displaying the image on the ground surface comprises:
    determining that the ridehail user is within an operative distance from the vehicle; and
    displaying, via the puddle lamp controller, the image on the ground surface in response to receiving the reply packet, and further in response to determining that the ridehail user is within the operative distance from the vehicle.

4. The method according to claim 3, wherein determining that the ridehail user is within the operative distance from the vehicle comprises:
    receiving, from a vehicle sensor, data indicative of the ridehail user approaching the vehicle;
    estimating, using the data indicative of the ridehail user, a distance from the vehicle to the ridehail user approaching the vehicle; and
    responsive to determining that the distance is less than a threshold value, sending a proximity message to a puddle lamp controller, wherein the proximity message is indicative of the distance from the vehicle to the ridehail user approaching the vehicle.

5. The method according to claim 4, further comprising:
    determining an identity of the ridehail user approaching the vehicle.

6. The method according to claim 1, wherein the image comprises a message indicative of an identity of the vehicle or an availability for providing a ridehail.

7. The method according to claim 1, further comprising:
    determining a count of mobile devices operative within a range of distance from the vehicle;
    determining that the count exceeds a threshold number of mobile devices;
    sending, to the puddle lamp image server, the unique identifier indicative of a puddle lamp controller onboard the vehicle, the geographic location of the vehicle, and the number of mobile devices operative within the range of distance from the vehicle;
    receiving, from the puddle lamp image server, the reply packet comprising the image associated with the geographic location of the vehicle, and further comprising an instruction for displaying the image based on the determination that the count exceeds a threshold number of mobile devices; and
    displaying the image on the ground surface responsive to receiving the reply packet, and based on the instruction from the puddle lamp image server.

8. The method according to claim 7, further comprising:
    receiving, from the puddle lamp image server, the reply packet comprising the image associated with the geographic location of the vehicle, and a route associated with the number of mobile devices operative within the range of distance from the vehicle; and
    following the route while displaying the image on the ground surface.

9. The method of claim 1, further comprising:
    receiving, by an interface of the vehicle, an indication of a custom message to display; and
    displaying, via the puddle lamp controller, a second image including the custom message.

10. The method of claim 1, wherein the image further includes identifying information associated with a ridehail user, wherein the image is displayed adjacent to a door associated with an assigned seat of the ridehail user.

11. A system, comprising:
    a puddle lamp controller,
    a processor; and
    a memory for storing executable instructions, the processor configured to execute the instructions to:
        send, to a puddle lamp image server via a wireless communication device associated with a vehicle, a unique identifier indicative of the puddle lamp controller onboard the vehicle, and a geographic location of the vehicle;
        receive, from a puddle lamp image server, a packet comprising an image associated with a geographic location of a vehicle; and
        display, via the puddle lamp controller, the image on a ground surface responsive to receiving the packet, wherein the image comprises indicia of a business or service associated with the geographic location of the vehicle, wherein the image further includes a directional arrow or route instructions to a location of the business or service.

12. The system according to claim 11, wherein the vehicle is an autonomous vehicle associated with a ridehail service.

13. The system according to claim 11, wherein the packet further comprises trip information associated with a ridehail user, the processor further configured to display the image on the ground surface by executing the instructions to:
   determine that the ridehail user is within an operative distance from the vehicle; and
   display, via the puddle lamp controller, the image on the ground surface in response to receiving the packet, and further in response to determining that the ridehail user is within the operative distance from the vehicle.

14. The system according to claim 13, wherein the processor is further configured to determine that the ridehail user is within an operative distance from the vehicle by executing the instructions to:
   receive, from a vehicle sensor, data indicative of the ridehail user approaching the vehicle;
   estimate, using the data indicative of the ridehail user, a distance from the vehicle to the ridehail user approaching the vehicle; and
   responsive to determining that the distance is less than a threshold value, send a proximity message to a puddle lamp controller, wherein the proximity message is indicative of the distance from the vehicle to the ridehail user approaching the vehicle.

15. The system according to claim 14, wherein the processor is further configured to execute the instructions to:
   determine an identity of the ridehail user approaching the vehicle or determine an intent of the ridehail user to enter the vehicle.

16. The system according to claim 11, wherein the image comprises a message indicative of an identity of the vehicle.

17. A non-transitory computer-readable storage medium having instructions stored thereupon which, when executed by a processor, cause the processor to:
   send, to a puddle lamp image server via a wireless communication device associated with a vehicle, a unique identifier indicative of a puddle lamp controller onboard the vehicle, and a geographic location of the vehicle;
   receive, from the puddle lamp image server, a reply packet comprising an image associated with the geographic location of the vehicle; and
   display, via the puddle lamp controller, the image on a ground surface responsive to receiving the reply packet, wherein the image comprises indicia of a business or service associated with the geographic location of the vehicle, wherein the image further includes a directional arrow or route instructions to a location of the business or service.

18. The non-transitory computer-readable storage medium of claim 17, wherein the instructions further cause the processor to:
   determine a number of pedestrians along a first route option of a ridehail trip associated with a ridehail user;
   navigate the vehicle using the first route based on the number of pedestrians being greater than a threshold amount; and
   displaying, during navigation along the first route, a third image on the ground surface, the third image including a second indicia a business or service associated with the geographic location of the vehicle.

* * * * *